US006959962B2

(12) United States Patent
Dixon

(10) Patent No.: US 6,959,962 B2
(45) Date of Patent: Nov. 1, 2005

(54) SUPPORT APPARATUS FOR SEATED PATIENT

(76) Inventor: Barry James Dixon, 4 Anglers Esplanade, Runaway Bay, QLD 4216 (AU)

( * ) Notice: Subject to any disclaimer, the term of this patent is extended or adjusted under 35 U.S.C. 154(b) by 0 days.

(21) Appl. No.: 10/271,544

(22) Filed: Oct. 17, 2002

(65) Prior Publication Data

US 2003/0090132 A1 May 15, 2003

Related U.S. Application Data

(63) Continuation-in-part of application No. 09/806,494, filed as application No. PCT/AU99/00890 on Oct. 15, 1999, now abandoned.

(30) Foreign Application Priority Data

Oct. 15, 1998 (AU) .............................................. PP6511

(51) Int. Cl.[7] .............................................. B60N 2/38
(52) U.S. Cl. .............................................. 297/195.11
(58) Field of Search ........................ 297/423.11, 423.12, 297/423.13, 195.1, 195.11; 5/612, 83.1, 81.1 R, 81.1 RP, 81.1 HS

(56) References Cited

U.S. PATENT DOCUMENTS 2,757,388 A * 8/1956 Chisholm .................. 5/507.1
3,754,787 A * 8/1973 Garber .................... 297/195.1
4,614,378 A 9/1986 Picou
4,650,249 A 3/1987 Serber
4,746,167 A 5/1988 Palmer et al.
4,971,040 A 11/1990 Gillotti
5,186,519 A 2/1993 Larson
5,189,741 A * 3/1993 Beardmore ................... 5/86.1
5,295,728 A * 3/1994 Schaevitz ................ 297/195.1
5,333,333 A * 8/1994 Mah ............................ 5/87.1
5,401,078 A 3/1995 Riach
5,524,303 A * 6/1996 Palmer et al. ........... 5/81.1 RP
5,971,485 A 10/1999 Clark
6,065,808 A * 5/2000 Tinsley
6,244,285 B1 * 6/2001 Gamache ..................... 135/67

FOREIGN PATENT DOCUMENTS

WO WO 94/09740 5/1994

* cited by examiner

*Primary Examiner*—Milton Nelson, Jr.

(57) ABSTRACT

A patient support for providing supplementary support for patients undergoing procedures such as epidurals. The support can be secured in position alongside a bed or operating table provides a number of options as to the mode of the support required by the patient for various procedures and treatments.

20 Claims, 9 Drawing Sheets

SUPPORT APPARATUS FOR SEATED PATIENT

This application is a continuation-in-part of U.S. patent application Ser. No. 09/806,494, filed May 25, 2001, now abandoned which is a 371 of PCT/AU99/00890, filed Oct. 15, 1999.

TECHNICAL FIELD

This invention relates to a patient support apparatus for use in conjunction with a bed, chair, stool or operating table.

BACKGROUND ART

The present method of administering treatments such as an epidural to a patient is most unsatisfactory and is in general in conflict with hospital policies of non-manual contact and lifting.

Present epidural procedures require the patient to sit on the edge of the bed or operating table, lean forward into the hands of a wardsperson while the qualified medical practitioner administers the epidural from across the bed. The procedures are traumatic for the doctor, the patient and the wardsperson for obvious reasons.

The wardsperson may be male or female, large or small, as can be the patient. A small wardsperson could not be confident of safely supporting a large patient during this dangerous procedure.

It is also very difficult to ensure adequate curvature of the lumbar spine during epidural, spinal, endoscope procedures, while being held by a wardsperson.

U.S. Pat. Nos. 5,971,485 and 5,401,078 entitled “Adjustable Folding Chair for Massage” and “Adjustable Therapy Chair” respectively describe chairs which provide full bodily support for patients, both provide adjustments to achieve varying treatment positions and can be folded into a compact form for storage when not in use. The chairs however require a patient to be seated thereon and this is not always convenient or possible, particularly in a hospital situation.

An object of the present invention is to provide an apparatus for providing supplementary support to a patient undergoing a variety of procedures from a seated position.

Further objects and advantages of the present invention will become apparent from the ensuing description which is given by way of example only.

DISCLOSURE OF INVENTION

According to the present invention, there is provided a patient support for providing supplementary support to a patient in a sitting position the support comprising;

a. a main limb having an elongate upright and a footing, b. engagement means connected to and extending from the support, the engagement means being adapted for engagement beneath a horizontal member of a bed, and c. a rest for receiving and providing support to a patient’s upperbody, wherein when the support is erected and placed adjacent to a patient in a seating position the patient can lean forward and be provided with supplementary bodily support.

The elongate upright can pivotably mount a brace provided with adjustable engagement means which can be adjusted for engagement beneath a horizontal member of the bed to at least partially support a patient’s weight.

The support can include means by which the pivotable connection between the brace and the main limb can be locked.

The engagement means can be pivotably and telescopically mounted to the brace.

The footing of the brace can be provided with ground wheels or rollers.

The footing of the main limb and brace can extend to either side of the uprights thereof.

The engagement means can be pivotably and telescopically mounted to the upright.

The footing can include a limb which extends in the same direction as the rest.

The upright of the main support can be provided with a plurality of crossbars to provide support for a patient’s feet and/or for use as handle bars.

The positions of the crossbars on the main support can be adjustable.

According to a further aspect of the present invention, there is provided a patient support having a rest comprising a crossbar and a sternum support mounted centrally of the crossbar.

The support can include a facial support/receptacle mounted on the crossbar in a position opposite the sternum support.

The facial support receptacle can pivot with respect to the crossbar.

Elements of the rest can be padded and upholstered.

BRIEF DESCRIPTION OF THE DRAWINGS

Aspects of the present invention will now be described with reference to the accompanying drawings in which.

Figure 1:
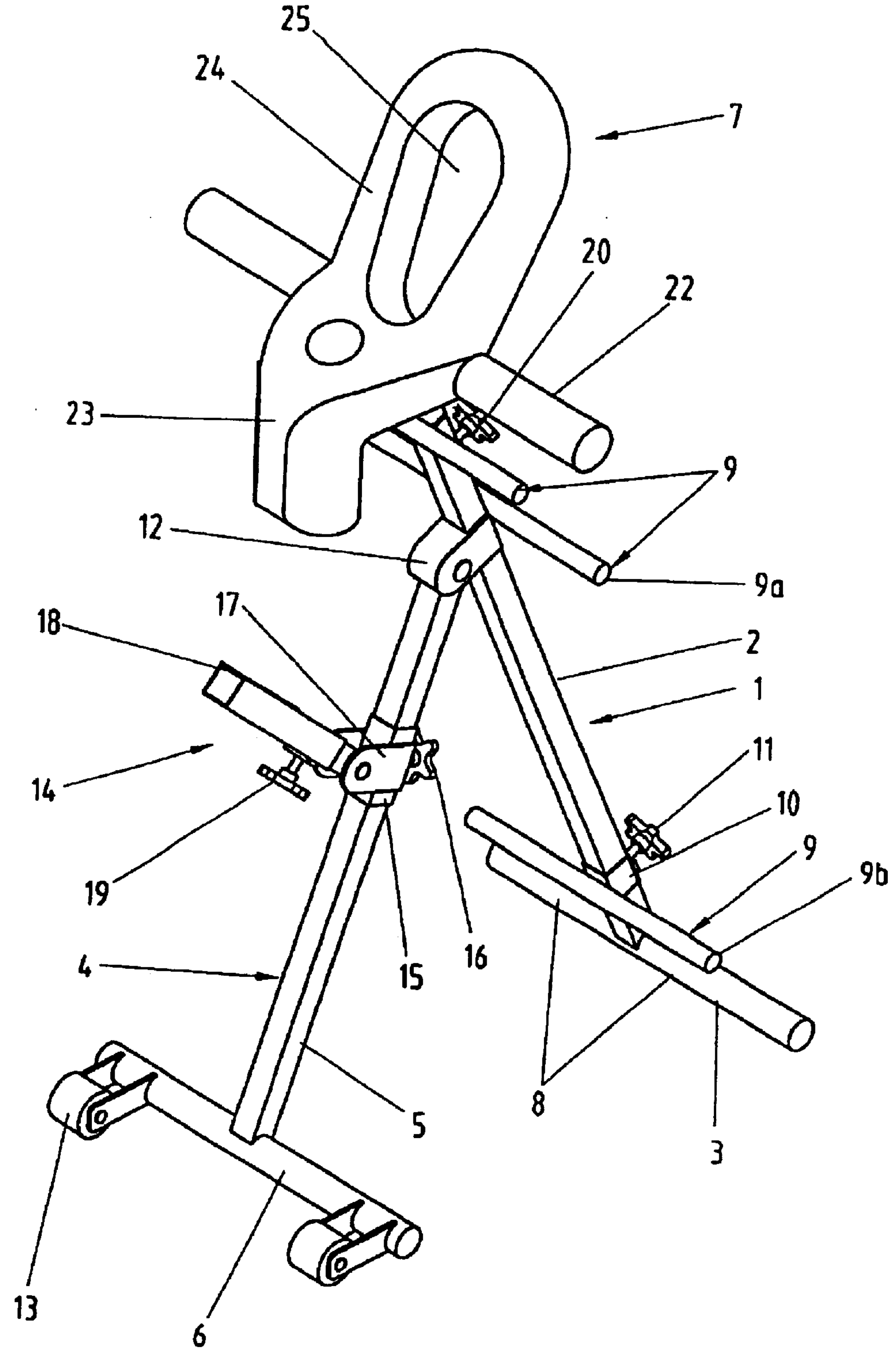
FIG. 1 is a rear perspective view of apparatus according to the present invention.
Figure 2:
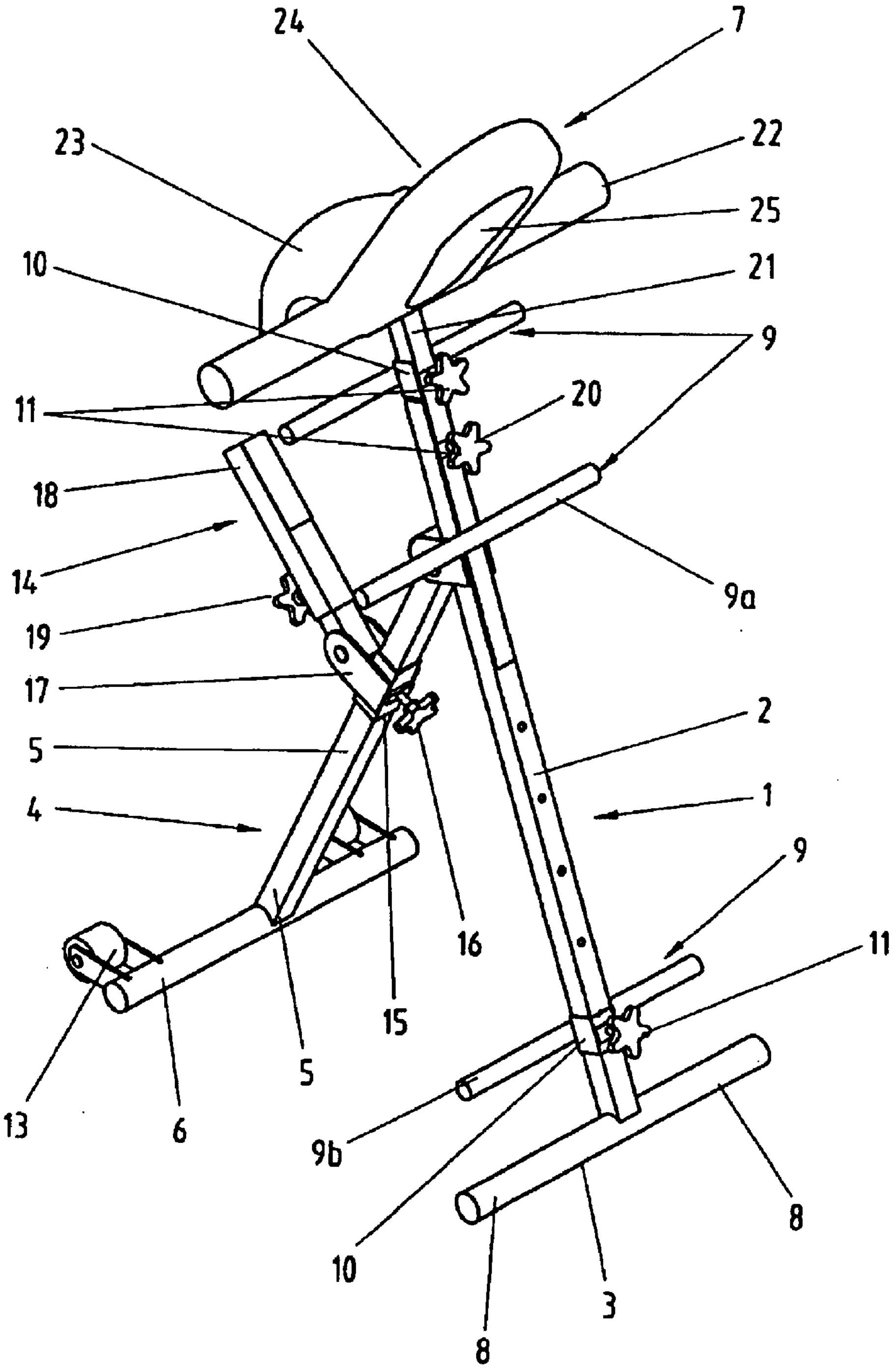
FIG. 2 is a front perspective view of the apparatus of FIG. 1, and FIGS. 3 and 4 are front and side views of the apparatus of FIG. 1, and FIGS. 5 and 6 are side and front views of the rest for the apparatus of FIG. 1, and FIGS. 7 and 7(*e*) are schematic drawings showing various modes of use for the apparatus of the present invention.
Figure 3:
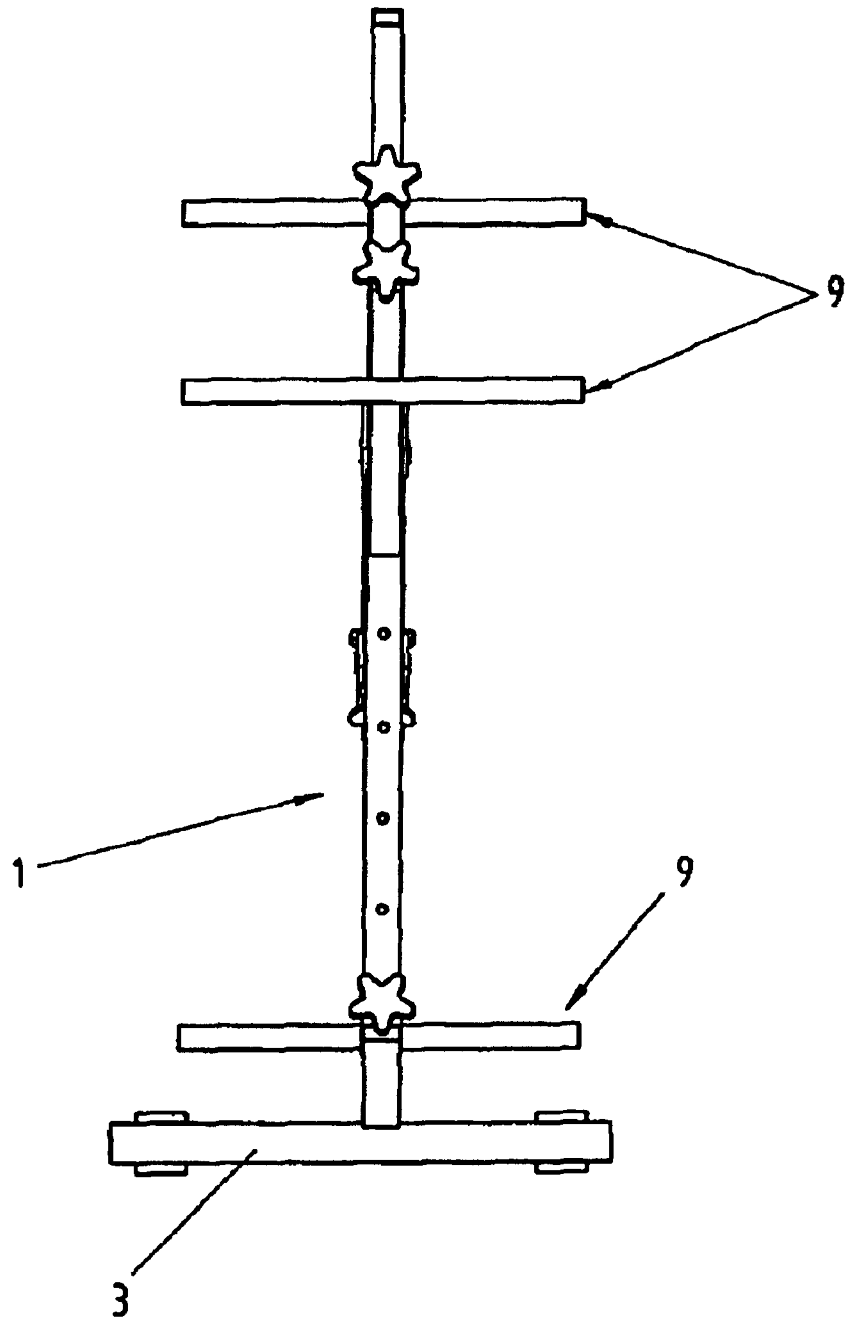
Figure 4:
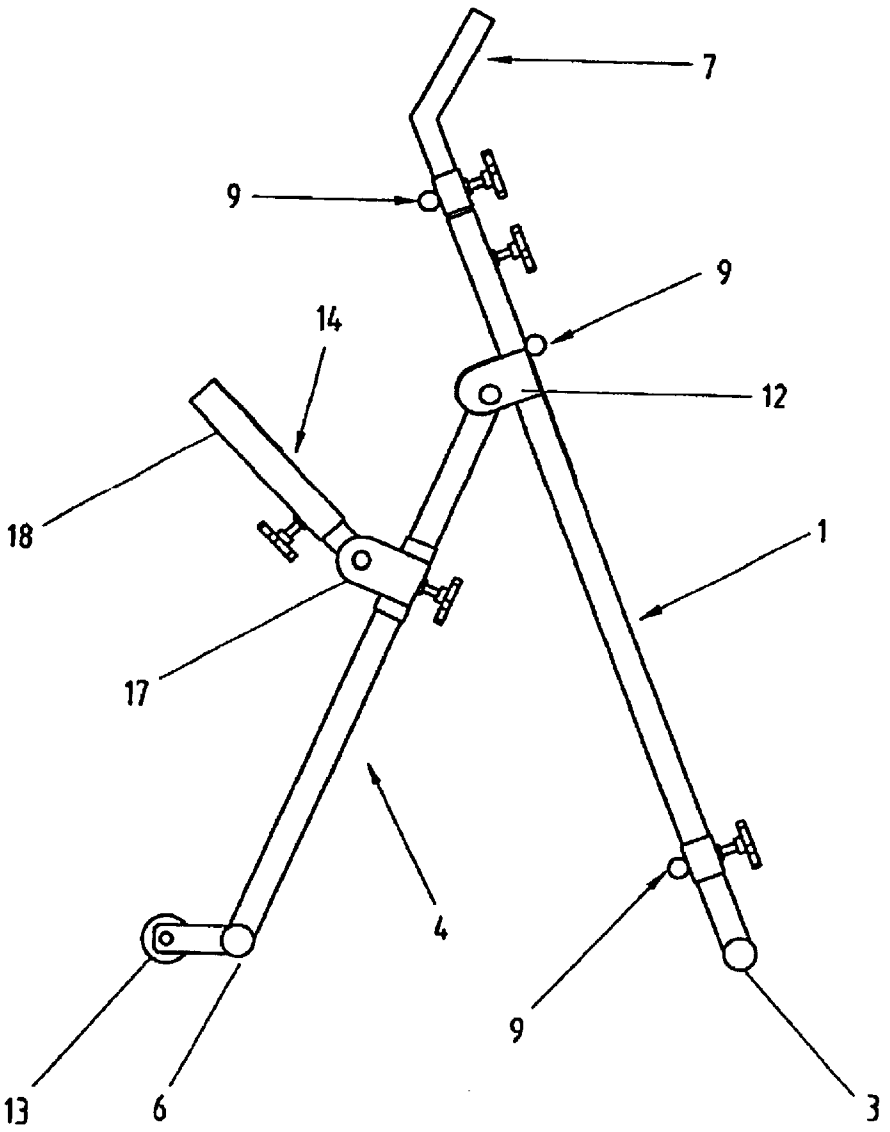
Figure 5:
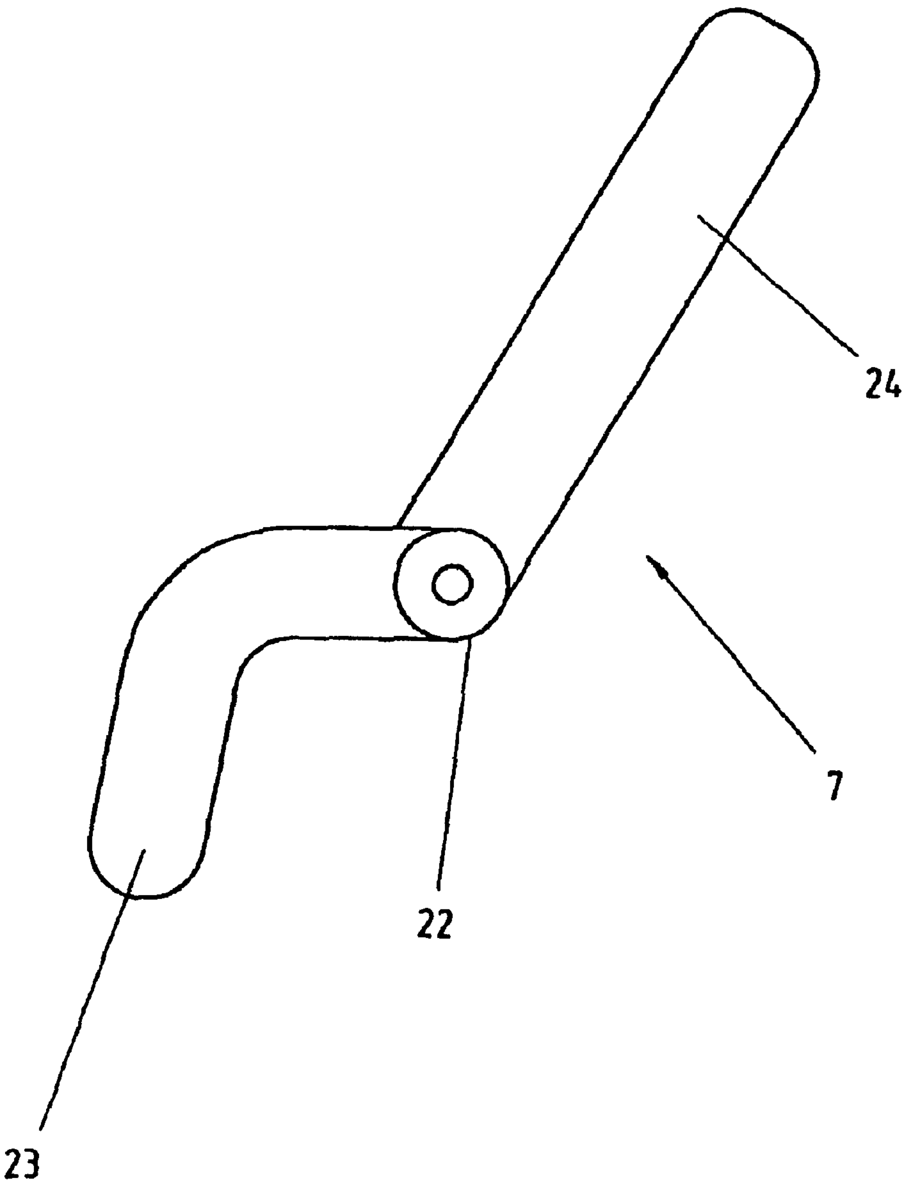
Figure 6:
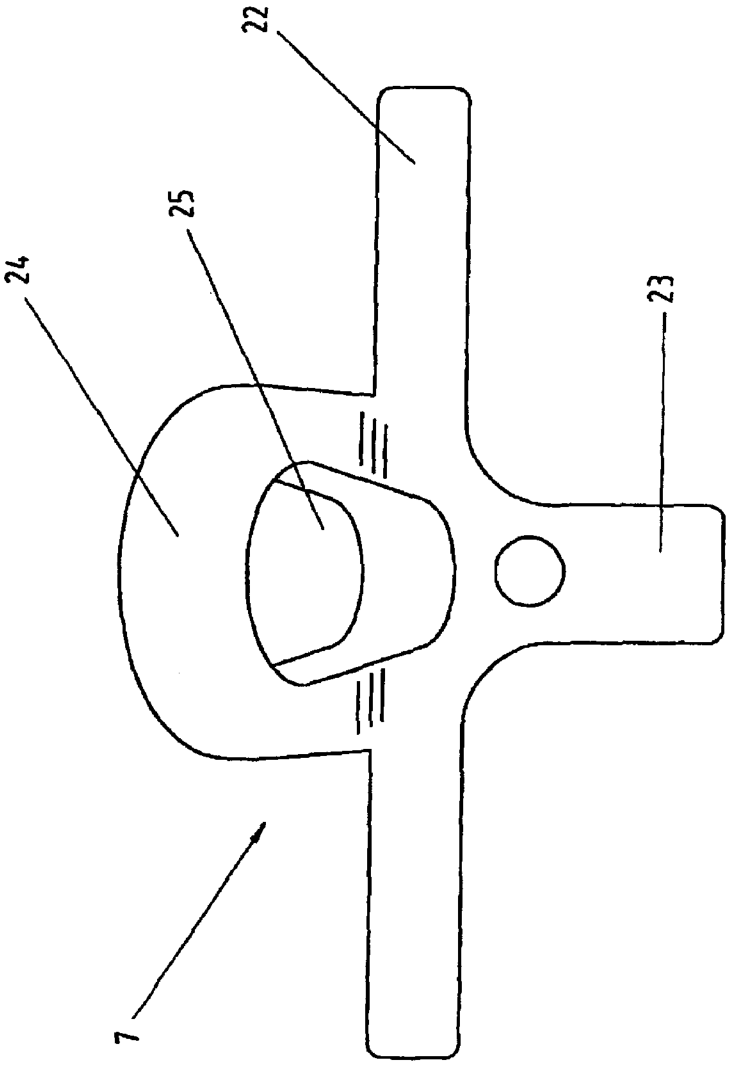

With respect to the drawings apparatus according to he present invention comprises a main limb generally indicated by arrow 1 having an elongate upright 2 and a footing 3, a brace generally indicated by arrow 4 which has an upright 5 and a footing 6 and a rest generally indicated by arrow 7 for providing support for a patient’s upper body parts.

The footing 3 of the limb 1 can be cylindrical tube having opposed ends 8 extending to either side of upright 2.

The upright 2 which can be manufactured from metal tubestock mounts a plurality of cross-bars generally indicated by arrow 9. One crossbar 9*a* can be fixed and two others 9*b* are adjustable on the upright 2.

As will be explained later the crossbars 9 can be used either as footrests or as handle bars.

The adjustable crossbars 9*b* can be fitted to a collars 10 having threaded locking members 11.

The upright 5 is adapted to act as a brace for the upright 2 and is pivotably connected to the upright by a pivot arrangement 12. When the apparatus is correctly positioned the pivot connection can be locked using a locking device such as an allen key (not shown).

The footing 6 of the upright 5 extends to either side of the upright 5 and can be provided with wheels or rollers 13.

The upright 5 mounts adjustable engagement means generally indicated by arrow 14. The engagement means 14 is slidable and lockable on the upright 5 and comprises a collar 15 and a lock 16. Forks 17 extend from the collar 15 and mount a telescopic arm 18.

The degree that the arm 18 extends is adjustable and the arm 18 can be locked in position by a locking device 19.

In use the engagement means 14 can be set at an angle beneath the rail of a bed or operating table with the contact position ensuring that the apparatus cannot roll away from the bed or table. Means such as allen keys (not shown) may be used to lock arm 18 at a set incline.

The rest 7 can be adjustably mounted on the end of the upright 2 and locked in position by a locking device 20. The rest has a shaft 21 which can telescope within the upright 2.

The rest 7 has a crossbar 22 a sternum support 23 and a facial support/receptacle 24 and all elements of the rest can be padded and upholstered for the comfort of users.

The sternum support 23 is a substantially L-shaped appendage to the crossbar 22.

The facial support 24 is provided with a face opening 25. The facial support 24 is able to pivot with respect to the sternum support. A pivoting action can be achieved by using an internal hinge (not shown) or by virtue of the resilience of the material from which the core or body of the rest 7 is manufactured.

The shape and configuration of the rest is designed to provide due comfort to female patients and provides space to either side of the sternum support for the patient's breasts. Because the sternum support extends some way towards the patient position adequate space is provided between a patient and the upright 2 to accommodate the stomach of a pregnant female patient.

Figure 7:
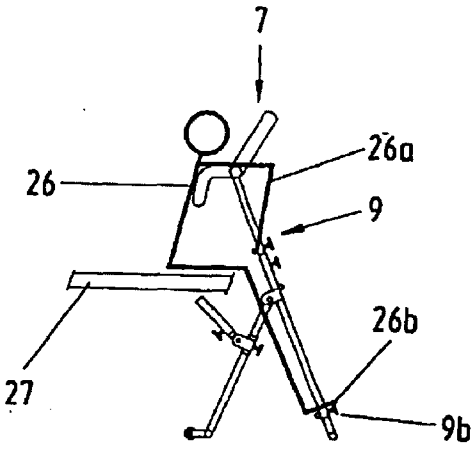

FIGS. 7 to 7(*e*) are schematic drawings showing various modes of use of the apparatus of the present invention.

In FIG. 7 the patient 26 is seated on a support 27. The patient's arms extends over crossbar 22 of the rest 7 and the crossbar 9 is gripped. The patient's chest is hard against the sternum support 23 and the patient's feet 26*b* rest on crossbar 9*b*. The patient's upper body is leaning towards the apparatus.

Figure 7A:
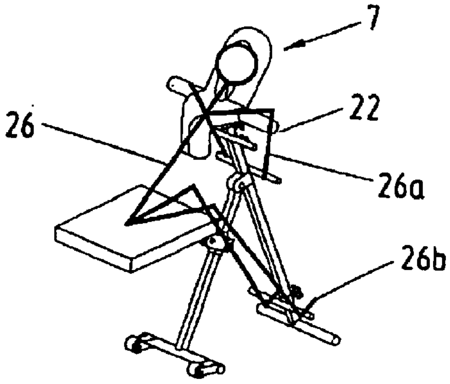
Figure 7B:
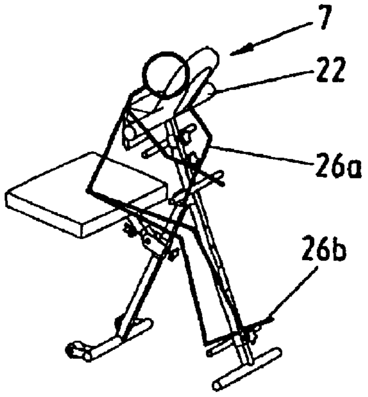
Figure 7C:
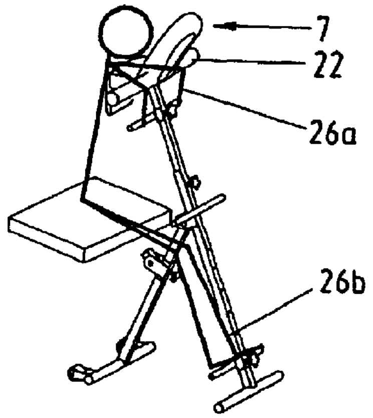
Figure 7D:
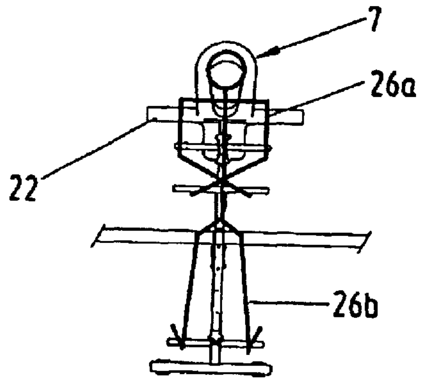
Figure 7E:
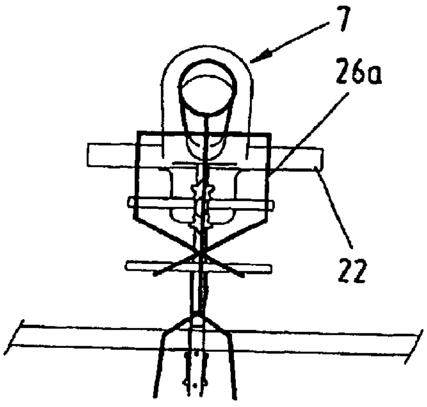

In FIG. 7*a* a similar position to that of FIG. 7 is assumed by the patient and in this instance the patient's face is engaged with facial support 24 and the patient's back is on a steeper incline.

In FIG. 7(*b*) the patient's arms are beneath the crossbar 22, are crossed over and grip the crossbar 9.

In FIG. 7(*c*) the patient's arms extend over the crossbar 22 and grip crossbar 9.

In FIG. 7(*d*) the patient's arms 26*a* extend over the crossbar 22 and a cross-over grip is employed.

In FIG. 7(*e*) the patient's arms 26*a* extend over the crossbar 22 and the feet 26*b* are not in contact with crossbar 9*b*.

Figure 8:
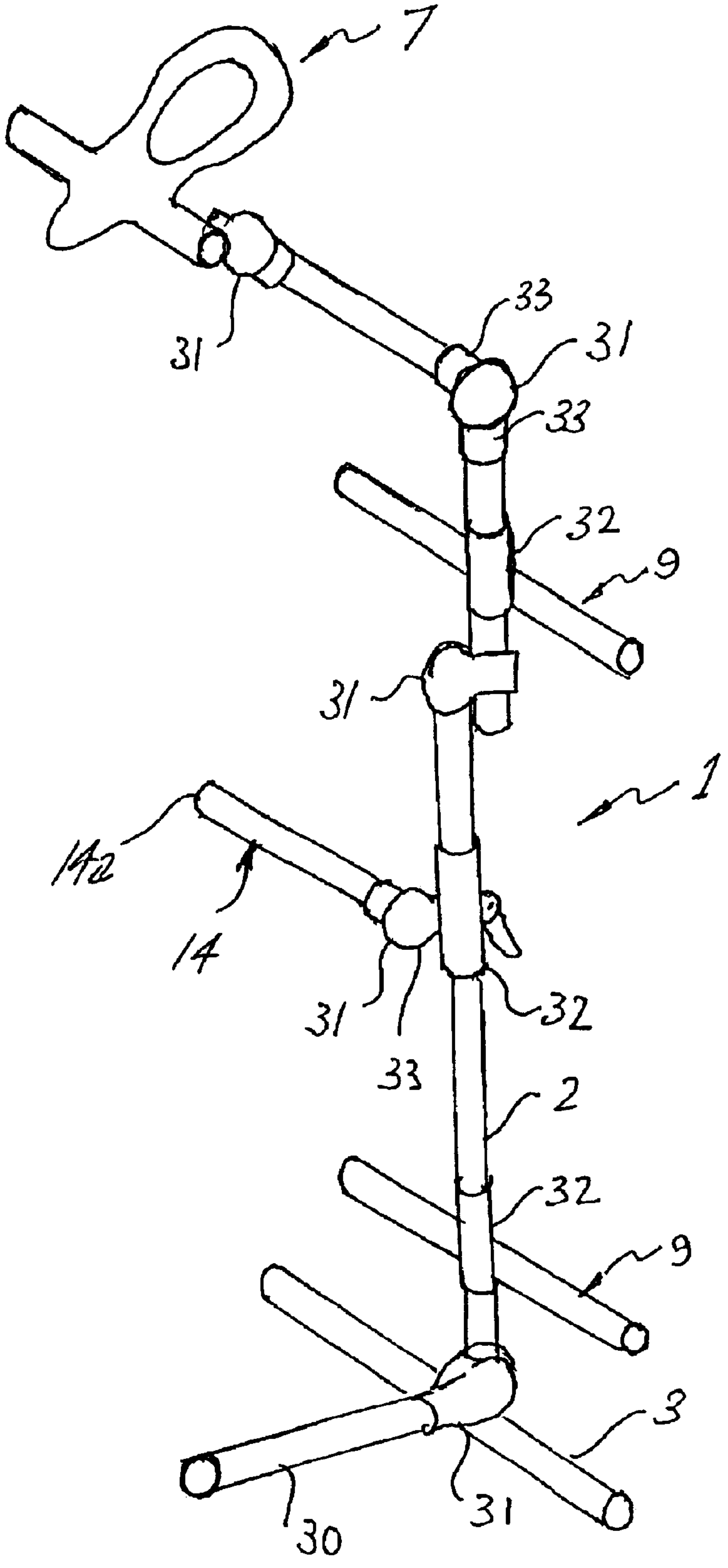
FIG. 8 of the drawings is a perspective view of a further possible embodiment of the present invention.

With respect to FIG. 8 of the drawings, this embodiment is similarly configured to the apparatus previously described having a main limb generally indicated by arrow 1 comprising an upright 2 and footing 3 and a rest 7. The brace 4 of the previously described embodiment is omitted and an additional footing 30 is substituted, and the engagement means 14 is fixed directly to the upright 2.

Other modifications include the use of adjustable pivot joints 31 at various points on the structure and in addition sliding mounting sleeves 32.

As a further option, the free end 14*a* of the engagement means 14 can be provided with a clamping device (not shown).

The advantage of this embodiment is that the elimination of the brace 14 of the previous embodiment enables the apparatus to be positioned closer to a bed or other horizontal support surface, the pivot joints 30 and the sliding mounting sleeves 32 allow numerous adjustments to be made to cater for different body types and conditions and for different procedures.

Figure 8A:
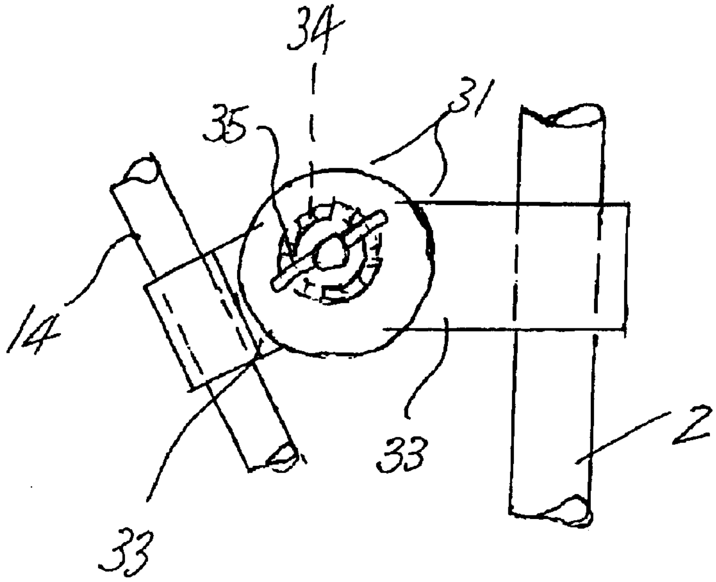
FIGS. 8*a* and 8*b* are perspective drawings of adjustable pivots and a sliding mounting sleeve for the apparatus of FIG. 8.
Figure 8B:
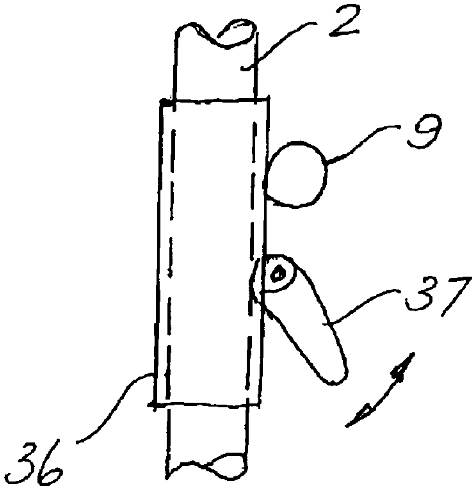

FIGS. 8*a* and 8*b* of the drawings illustrate a typical adjustable pivot joint 31 as illustrated by FIG. 8*a* which comprise brackets 33 for mounting limbs of the apparatus such as upright 2 and engagement means 14. Each limb 33 is provided with internal gearing 34 and a tightening device such as a thumbscrew 35. Adjustments of the relative angles of the limbs can be made by loosening the thumbscrew 35, changing the relative angles and retightening the thumbscrew to lock the internal gearing.

Sliding adjustment of components can be achieved by mounting components such as a crossbar 9 on a sleeve 36 which mounts a cam-lock lever 37 as is illustrated by FIG. 8*b*.

The present invention provides a stable, strong, multiple adjustable, total support system for all sizes of patients. By virtue of its multiple adjustments, the apparatus ensures all patients position themselves with adequate curvature of the lumbar spine for ease of procedures. A patient need not be removed from a bed in order to assume an appropriate treatment position. The apparatus engages a patient bed to achieve stability. The apparatus is adjustable to fit all hospital beds and operating tables. The invention has a scope for many uses including, but not limited to:

Epidural procedures

Spinal treatments

Endoscopy

Maternity care

Aspects of the present invention have been described by way of example only and it should be appreciated that modifications and additions may be made thereto without departing from the scope thereof as defined in the appended claims.

What is claimed is:

1. An apparatus for use with patients undergoing a procedure from a seated position comprising:

a substantially horizontal support providing seated support for said patient, a supplemental patient support independent of said horizontal support and next to said horizontal support, said supplemental patient support comprising:

a main limb, a footing attached to and extending from said main limb and at least partially supporting said main limb in a substantially upright position, an upper rest attached to the top end of said main limb for supporting in a leaning position, the upper body of the patient seated on said horizontal support, and said horizontal support separate from and not attached to said patient support; and engagement means extending beneath and contacting said horizontal support to prevent movement of said supplemental patient support away from said horizontal support.

2. The apparatus of claim 1, further comprising a foot support attached to and extending from said main limb for supporting the feet of said patient seated on said horizontal support.

3. The apparatus of claim 1, further comprising a floor engaging brace attached to and extending from said main limb.

4. The apparatus of claim 3, wherein said engagement means is pivotally connected to said brace.

5. The apparatus of claim 1, wherein said upper rest is L-shaped and has an aperture defining a facial receptacle for receipt of the face of the patient.

6. The apparatus of claim 1, wherein said horizontal support is a bed.

7. An apparatus for use with patients undergoing a procedure from a seated position, said apparatus comprising:

a bed on which a patient can be seated, a supplemental patient support next to said bed, said patient support comprising:

a main limb, an upper rest attached to the top end of said main limb for supporting the upper body of the patient in a leaning position, means extending from said main limb and supporting said main limb in a substantially upright attitude, and engagement means extending beneath and contacting said bed to prevent movement of said supplemental patient support away from said bed.

8. The apparatus of claim 7, further comprising a foot support attached to and extending from said main limb.

9. The apparatus of claim 7, wherein said main limb supporting means comprises a footing attached to and extending from a lower end of said main limb.

10. The apparatus of claim 9, wherein said footing includes a footing part extending from said main limb in a direction towards said bed for positioning of said main limb close to said bed.

11. The apparatus of claim 7, wherein said engagement means is pivotally connected to said main limb for pivotal adjustment of the position of the engagement means.

12. The apparatus of claim 7, and including a slide supporting said engagement means for slidable adjustment along said main limb.

13. The apparatus of claim 7, wherein said engagement means is telescopically adjustable.

14. The apparatus of claim 7, wherein said main limb comprises an elongated member.

15. A patient support for providing supplemental support to a patient in a seated position on a bed and undergoing a procedure, said patient support being independent of said bed and comprising:

a main limb, a footing attached to and extending from said main limb for supporting said main limb in a substantially upright position, an upper rest attached to an upper end of said limb for supporting the upper body of a patient leaning from said seated position on said bed, and an engagement member mounted to said main limb and extending therefrom, said engagement member being adapted to extend beneath said bed for engagement with said bed to prevent movement of said patient support away from said bed.

16. The patient support of claim 15, and including a foot support attached to and extending to both sides, of said main limb for supporting the feet of the patient.

17. The patient support of claim 16, wherein said foot support is attached to a collar, said collar being slidable along said main limb, and a lock to secure said collar to said main limb.

18. The patient support of claim 15, wherein said engagement member is mounted for hinged movement relative to said main limb.

19. The patient support of claim 15, wherein said upper rest has a central opening for receipt of the face of the patient.

20. The patient support of claim 15, and including a cross bar mounted to said main limb for providing support to the arms of the patient.

* * * * *